(12) United States Patent
Ishrak et al.

(10) Patent No.: US 6,406,430 B1
(45) Date of Patent: Jun. 18, 2002

(54) ULTRASOUND IMAGE DISPLAY BY COMBINING ENHANCED FLOW IMAGING IN B-MODE AND COLOR FLOW MODE

(75) Inventors: Syed O. Ishrak, Milwaukee; Gary E. MacLeod, Menomone Falls; Michelle G. Angle, Muskego; Anne L. Hall, New Berlin; James D. Hamilton, Menomonee Falls; Steven C. Miller, Waukesha, all of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/557,255

(22) Filed: Apr. 24, 2000

Related U.S. Application Data

(63) Continuation-in-part of application No. 09/065,212, filed on Apr. 23, 1998, now Pat. No. 6,074,348, which is a continuation-in-part of application No. 09/052,789, filed on Mar. 31, 1998, now abandoned.

(51) Int. Cl.[7] .................................................. A61B 8/06
(52) U.S. Cl. ....................................................... 600/441
(58) Field of Search ................................. 600/441, 440, 600/443, 447, 453–456

(56) References Cited

U.S. PATENT DOCUMENTS

| | | | | |
|---|---|---|---|---|
| 5,882,306 A | * | 3/1999 | Ramamorthy et al. | 600/441 |
| 5,921,931 A | * | 7/1999 | O'Donnell et al. | 600/441 |
| 6,074,348 A | * | 6/2000 | Chiao et al. | 600/443 |
| 6,110,117 A | * | 8/2000 | Ji et al. | 600/453 |
| 6,190,321 B1 | * | 2/2001 | Pang et al. | 600/453 |
| 6,210,332 B1 | * | 4/2001 | Chiao et al. | 600/443 |

* cited by examiner

Primary Examiner—Francis J. Jaworski
(74) Attorney, Agent, or Firm—McAndrews, Held & Malloy, Ltd.; Peter J. Vogel; Michael A. Dellapenna

(57) ABSTRACT

An ultrasound system (1) acquires data using a gray scale mode of operation and a color flow mode of operation. A transducer (10) generates receive signals in response to echo ultrasound waves received from a subject (S) being studied. A gray scale receive channel (9G) generates gray scale data representing movement of portions of the subject, in particular that of blood flow or contrast agents in blood or tissue. A color flow receive channel (9C) generates color flow data (e.g., either power data or velocity data) also representing movement of portions of the subject. A processor (30) combines the gray scale flow data with the color flow data and displays the result on a display monitor (19) such that moving portions of the subject are displayed with a colored gray scale image.

20 Claims, 5 Drawing Sheets

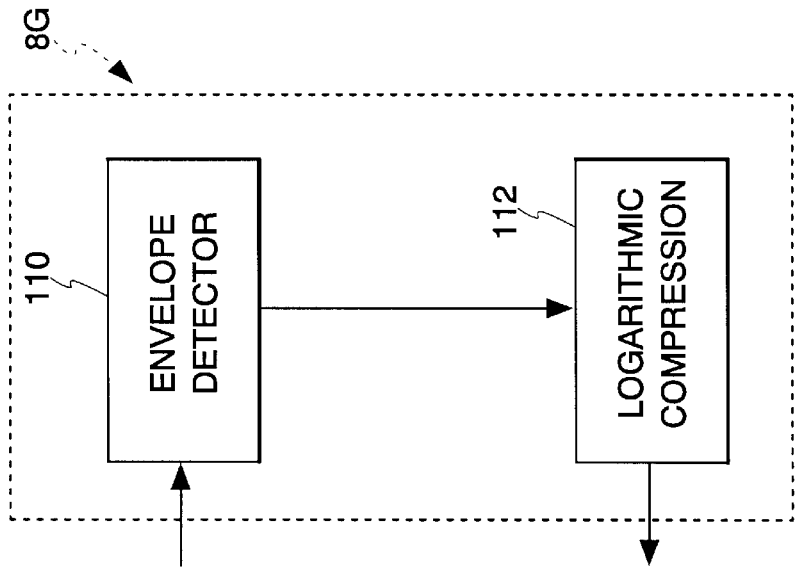
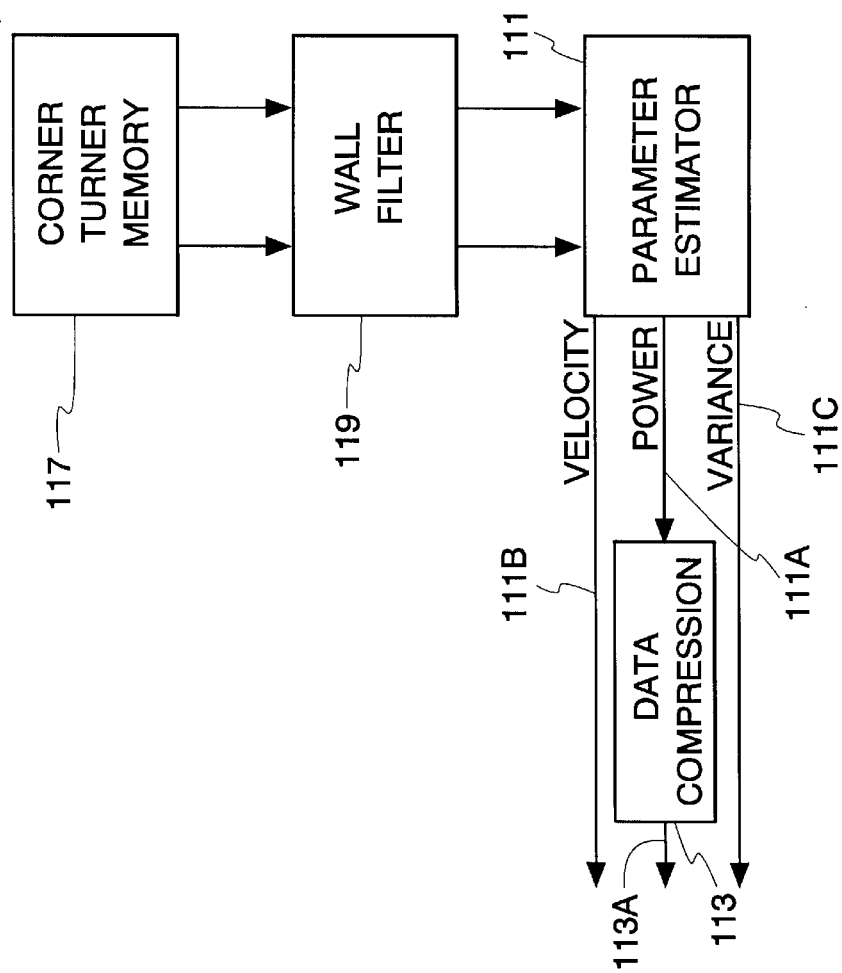

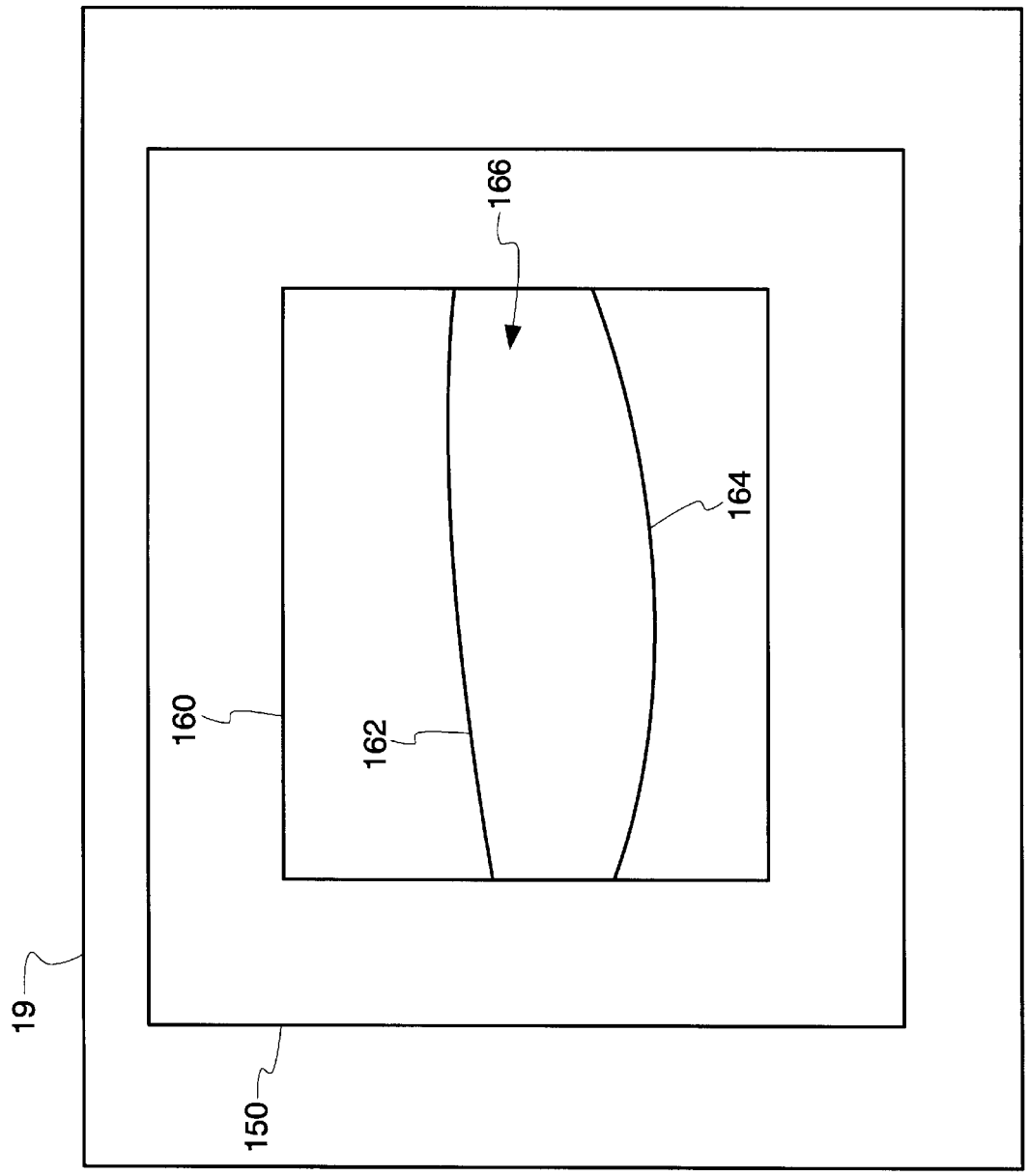

ULTRASOUND IMAGE DISPLAY BY COMBINING ENHANCED FLOW IMAGING IN B-MODE AND COLOR FLOW MODE

CROSS REFERENCE TO RELATED APPLICATIONS

This is a Continuation-In-Part of application Ser. No. 09/065,212, filed Apr. 23, 1998 U.S. Pat. No. 6,074,348 in the names of Richard Chiao et al., which is a Continuation-In-Part of application Ser. No. 09/052,789, filed Mar. 31, 1998, now abandoned.

BACKGROUND OF THE INVENTION

This invention generally relates to ultrasound imaging of the human anatomy for the purpose of medical diagnosis. In particular, the invention relates to methods and apparatus for imaging moving fluid or tissue (with or without contrast agents) in the human body by transmitting ultrasound waves into the moving fluid or tissue and then detecting ultrasound echoes reflected therefrom.

In U.S. application Ser. No. 09/065,212, entitled "Method And Apparatus For Enhanced Flow Imaging In B-Mode Ultrasound," filed Apr. 23, 1998, in the names of Richard Chiao et al., assigned to the parent of the assignee of the present application and incorporated by reference into this application, the applicants describe a new technique which allows visualization of flow hemodynamics and tissue motion in B-mode using gray scale data (hereafter "gray scale flow"). This modified B-mode technique provides fine resolution and high frame rate imaging by subtracting successive B-mode-like firings (for high resolution) to display changes (motion or flow) over time. However, the large bandwidth and small number of firings compared to color flow imaging limit sensitivity. In addition, signals from static tissue and flow are processed identically and presented using B-mode display, restricting possible image segmentation between stationary and flow regions. This invention addresses such problems and provides a solution.

BRIEF SUMMARY OF THE INVENTION

The preferred embodiment is useful in an ultrasound system which acquires data representing two dimensional images of blood flow and tissue motion using both a gray scale mode of operation and a color flow mode of operation. An image of a subject under study is displayed by combining the data from the gray scale and color flow modes of operation.

More particularly, a plurality of beams of ultrasound waves are transmitted into the subject and echo ultrasound waves are received from the subject in response to the transmitted ultrasound waves. The echo ultrasound waves are converted into corresponding received signals. The transmitting, receiving and converting preferably is accomplished with an ultrasound transducer. The transducer is pulsed a first predetermined number of times along one of the beams in the gray scale mode of operation so that the transducer transmits first ultrasound waves and generates first received signals in response to echo ultrasound waves received in response to the first ultrasound waves. The transducer is pulsed a second predetermined number of times along one of the beams during the color flow mode of operation so that the transducer transmits second ultrasound waves and generates second received signals in response to echo ultrasound waves received in response to the second ultrasound waves. Gray scale flow data and color flow data representing movement of portions of the subject are generated. The data preferably are generated in first and second receive channels, respectively. At least portions of the gray scale flow data and the color flow data are combined, preferably by a processor. An image responsive to the combined data is displayed, preferably by a display device. As a result, movement of portions of the subject are displayed with a color highlighted gray scale image.

Using the foregoing techniques provides increased sensitivity and image differentiation between flow and tissue regions through the addition of color data, while preserving the temporal and resolution benefits of the gray scale data.

BRIEF DESCRIPTION OF THE DRAWINGS

FIG. 2 is a schematic block diagram of a portion of the color flow receive channel shown in FIG. 1.

FIG. 3 is a schematic block diagram of a portion of the gray scale receive channel shown in FIG. 1.

FIG. 7 is an illustration of an exemplary form of display according to the preferred embodiment.

DETAILED DESCRIPTION OF THE INVENTION

Figure 1:
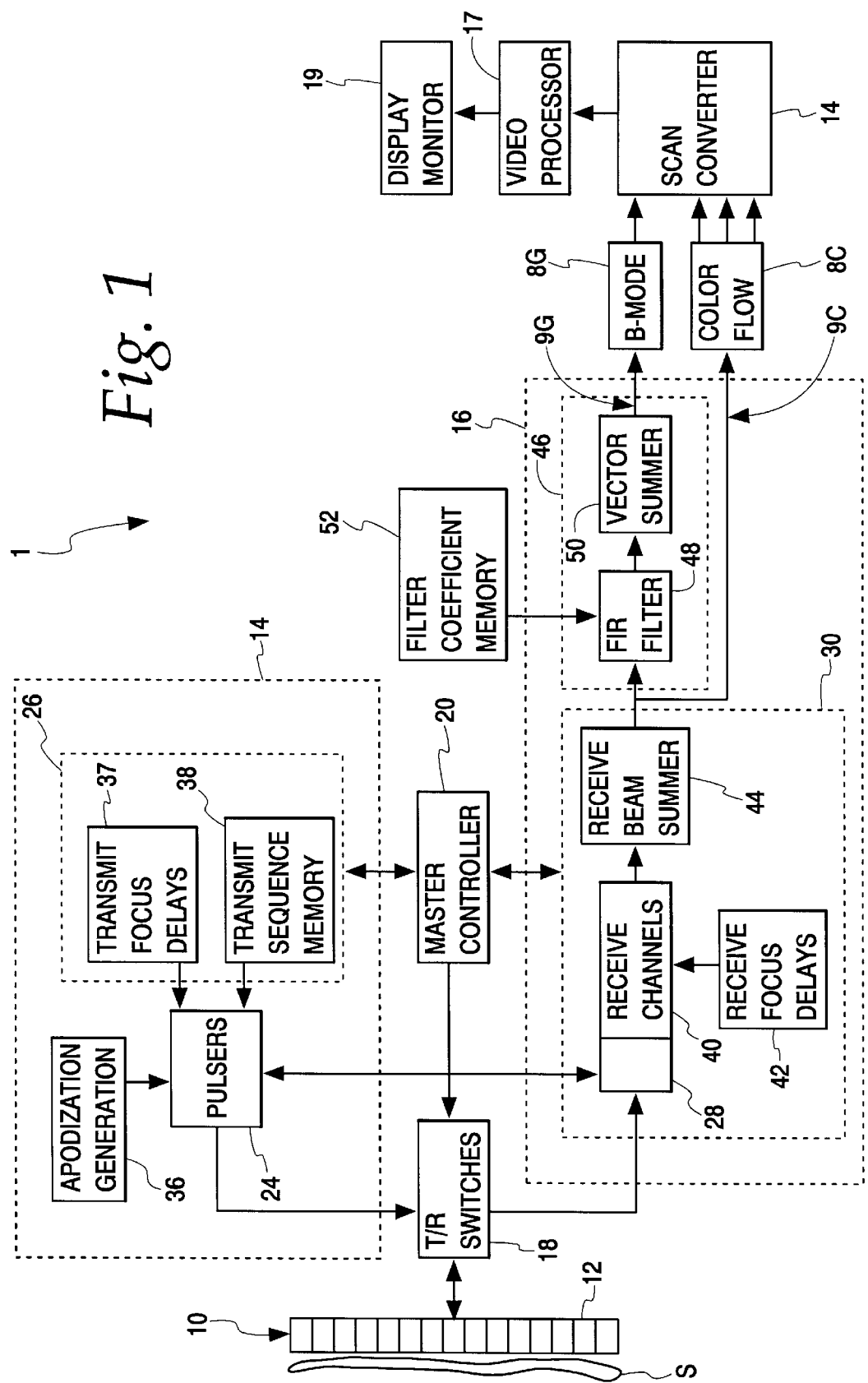
FIG. 1 is a schematic block diagram of a preferred form of ultrasound imaging system made in accordance with the present invention.

Referring to FIG. 1, an ultrasound imaging system 1 made in accordance with a preferred embodiment of the invention includes a transducer array 10 comprising a plurality of separately driven transducer elements 12, each of which produces a burst of ultrasonic energy when energized by a pulsed waveform produced by a transmitter 14. The ultrasonic energy reflected back to transducer array 10 from a subject under study (S) is converted to an electrical signal by each receiving transducer element 12 and is applied separately to a receiver 16 through a set of transmit/receive (T/R) switches 18. The T/R switches 18 are typically diodes which protect the receive electronics from the high voltages generated by the transmit electronics. The transmit signal causes the diodes to shut off or limit the signal to the receiver. Transmitter 14 and receiver 16 are operated under control of a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo received signals from each transducer element to produce a single echo signal which is used to produce a line in an image on a display monitor 19.

Under the direction of master controller 20, transmitter 14 drives transducer array 10 such that the ultrasonic energy is transmitted as a directed focused beam. To accomplish this, respective time delays are imparted to a plurality of pulsers 24 by a transmit beamformer 26. Master controller 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit 36, which may be a high-voltage controller that sets the power supply voltage to each pulser. Pulsers 24 in turn send the transmit pulses to each of elements 12 of transducer array 10 via T/R switches 18, which protect time-gain control (TGC) amplifiers 28 from the high voltages which may exist at the transducer array. Weightings are generated within apodization generation circuit 36, which may comprise a set of digital-to analog converters that take the weighting data from transmit beamformer 26 and apply it to pulsers 24. By appropriately adjusting the transmit focus time delays in a conventional manner and also adjusting the transmit apodization weightings, an ultrasonic beam can be directed and focused to form a transmit beam.

The echo signals are produced by each burst of ultrasonic energy waves reflected from objects in subject S located at successive ranges along each transmit beam. The echo signals are sensed separately by each transducer element 12, and a sample of the magnitude (i.e., amplitude) of the echo signal at a particular point in time represents the amount of reflection occurring at a specific range. Due to differences in the propagation paths between a reflecting point and each transducer element 12, the echo received signals will not be detected simultaneously and their amplitudes will not be equal. Receiver 16 amplifies the separate echo signals via a respective TGC amplifier 28 in each receive channel. The amount of amplification provided by the TGC amplifiers is controlled through a control path (not shown) that is driven by a TGC circuit (not shown), the latter being set by the master controller and hand operation of potentiometers. The amplified echo signals are then fed to a receive beamformer 30. Each receiver channel of the receive beamformer is coupled to a respective one of transducer elements 12 by a respective TGC amplifier 28.

Under the direction of master controller 20, receive beamformer 30 tracks the direction of the transmitted beam. Receive beamformer 30 imparts the proper time delays and receive apodization weightings to each amplified echo signal and sums them to provide an echo received signal which accurately indicates the total ultrasonic energy reflected from a point located at a particular range along one ultrasonic beam. The receive focus time delays are computed in real-time using specialized hardware or are read from a look-up table. The receive channels also have circuitry for filtering the received pulses.

Transmitter 14 has two modes of operation. In the gray scale mode, transducer 10 is pulsed 2–4 times along each ultrasound beam. In the color flow mode, transducer 10 is pulsed 6–16 times along each ultrasound beam. The details of the pulses being used are different between the two modes, with the gray scale firings being generally higher frequency, wider band, and possibly coded, compared to the color flow firings. Alternatively, the two modes could conceivably use the same set of firings, each processing the same set of data somewhat differently.

The time-delayed received signals are processed by receiver 16 in both the gray scale and color flow modes, and are supplied to two channels for processing, a gray scale channel 9G for processing gray scale flow data and a color flow channel 9C for processing color flow data. The outputs of channels 9G and 9C are sent to a conventional scan converter 14 which prepares the signals for display by a conventional display monitor 19. In the gray scale mode (e.g., B-mode), the envelope of the signal is detected with some additional processing, such as edge enhancement and logarithmic compression. Scan converter 14 receives the data from channels 9G and 9C and converts the data into the desired image for display. In particular, scan converter 14 converts the acoustic image data from a polar coordinate (R-θ) sector format to appropriately scaled Cartesian coordinate display pixel data at the video rate. These scan-converted acoustic data are then provided for display on display monitor 19, which images the data from the gray scale mode and color flow mode as a colored gray scale image. A respective scan line is displayed for each transmit beam.

Still referring to FIG. 1, in the gray scale mode, each transducer element 12 in the transmit aperture is pulsed N times using the same waveform by supplying transmit sequence 38 to each pulser N times. Pulsers 24 drive elements 12 of transducer array 10 such that the ultrasonic energy produced is directed or steered in a beam for each transmit firing. To accomplish this, transmit focus time delays 37 are imparted to the respective pulsed waveforms produced by the pulsers in response to transmit sequence 38. By appropriately adjusting the transmit focus time delays in a conventional manner, the ultrasonic beam can be focused at a desired transmit focal position.

For each transmit in the gray scale mode, the echo received signals from transducer elements 12 are fed to respective receive channels 40 of the receive beamformer. Under the direction of master controller 20, the receive beamformer tracks the direction of the transmitted beam. The receive beamformer imparts the proper receive focus time delays 42 to the received echo signal and sums them to provide an echo signal which accurately indicates the total ultrasonic energy reflected from a particular position along a transmit beam. The time-delayed receive signals are summed in a receive summer 44 for each of the N transmit firings focused at a particular transmit focal position. The summed receive signals for successive transmit firings are provided to a wall filter 46, which filters across the N transmit firings and then supplies a filtered signal to a B-mode midprocessor 8G which forms the envelope of the firing-to-firing filtered signal. After post-processing (including edge enhancement and logarithmic compression) and scan conversion, a scan line is displayed on display monitor 19. This procedure is repeated for all focal zone positions in each scan line making up the resulting image.

In accordance with the preferred embodiments of the invention, filter 46 comprises an FIR filter 48 having an input coupled to the output of receive summer 44; and a vector summer 50 having an input coupled to FIR filter 48 and an output coupled to gray scale B-mode unit 8G. Summer 50 effectively subtracts the amplitude values from identical range points over adjacent firings received at its input corresponding to the received signals resulting from pulsing transducer 10 along a beam in the gray scale mode. The FIR filter, which can be used to do bandwidth shaping or decoding of coded pulses, has M filter taps for receipt of a respective set of M filter coefficients for each transmit firing. The filter coefficients for the n-th transmit firing are $a_n c_0, a_n c_1, \ldots, a_n c_{M-1}$, where $a_n$ is the scalar weighting for the n-th transmit firing, n=0, 1, ..., N−1, and $c_0, c_1, \ldots, C_{M-1}$ is a set of filter coefficients which are selected so that FIR filter 48 passes a major fraction of the desired fundamental frequencies or desired (sub)harmonic frequencies in the receive signal, or effectively decodes coded waveforms. The scalar weightings $a_0, a_1, \ldots, a_{N-1}$ form a "wall" filter across the firings which selectively passes signals from reflectors moving at a velocity greater than a predetermined threshold. The filter coefficients $a_n c_0, a_n c_1, \ldots, a_n c_{M-1}$ are supplied to the filter for each transmit firing by the master controller from a filter coefficient memory 52. For example, for the first transmit firing, the set of filter coefficients $a_0 c_0, a_0 c_1, \ldots, a_0 c_{M-1}$ is supplied to the FIR filter; for the second transmit firing, the set of filter coefficients $a_1 c_0, a_1 c_1, \ldots, a_1 c_{M-1}$ is supplied to the FIR filter; and so forth. The filter coefficients are programmable depending upon the diagnostic application. Different sets of filter coefficients can be stored in look-up tables inside the master controller memory and the desired set of coefficients can be selectable by the system operator. For applications where the number of transmit firings N=2, pairs of sets of filter coefficients are stored in memory, one set of filter coefficients of a selected pair being transferred to the FIR filter before the first transmit firing and the other set of filter coefficients of the selected pair being transferred to the FIR filter after the first transmit firing and before the second transmit firing. Similarly, for applications where the number of transmit firings N=3, two or three sets of filter coefficients are stored in memory for use in filtering the receive signals resulting from the first through third firings. A similar procedure is enacted for applications where the number of transmit firings N>3. The successive FIR filter output signals for the N transmit firings are accumulated in a vector summer 50. The output signal of the vector summer then undergoes conventional gray scale B-mode processing, followed by scan conversion and display.

Figure 5:
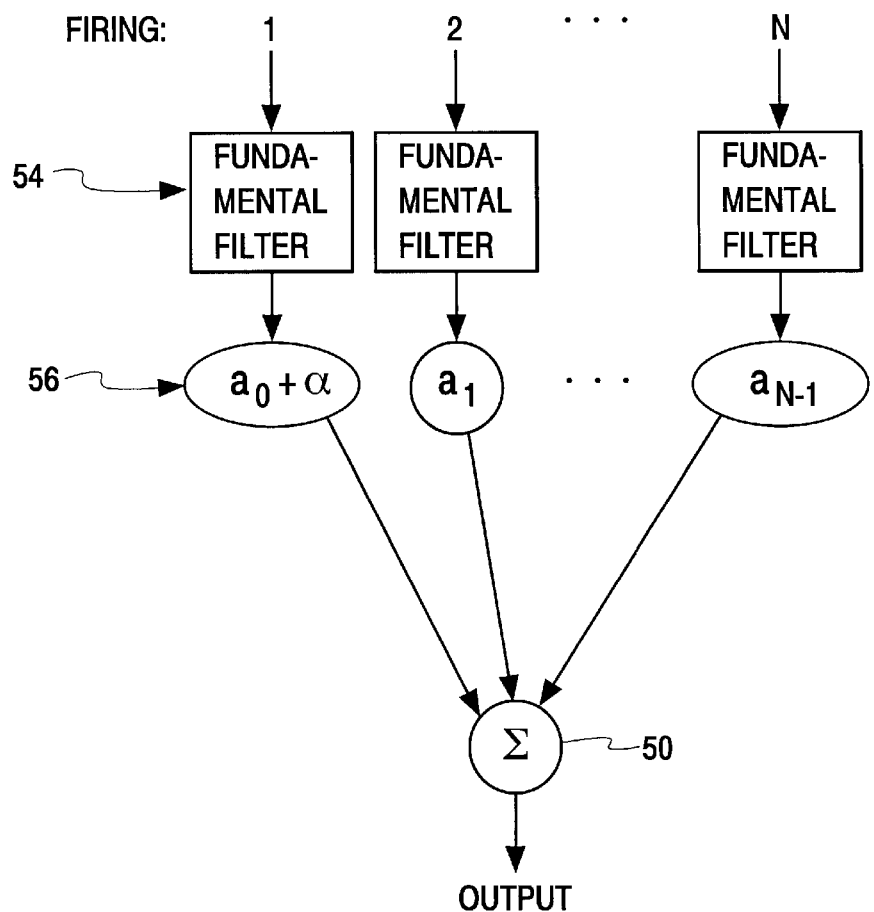
FIG. 5 is a flow chart showing B-mode (fundamental) flow filtering with B-mode feed-through in accordance with one preferred embodiment of the invention.

In accordance with one preferred embodiment of the invention, a sequence of N identical or coded (in this case they are not identical) broadband pulses, centered at a fundamental frequency of the corresponding transducer array, are transmitted by the array to a particular transmit focal position. On receive, a bandpass filter centered at the desired receive frequency substantially isolates the desired receive component. Subsequently a wall filter extracts the flow signal over the N transmits. A flow filter, such as shown in FIG. 5, may comprise two stages: the first stage 54 extracts a major fraction of the fundamental component and the second stage 56 substantially suppresses the stationary fundamental components with a high-pass wall filter. The same type of processing can also be done effectively extracting the (sub)harmonic flow signal, particularly for imaging contrast agents.

Both stages of a fundamental flow filter are embodied in the FIR filter 48 shown in FIG. 1. A set of filter coefficients $c_0, c_1, \ldots, c_{M-1}$ are selected so that the M-tap FIR filter 48 passes a major fraction of the fundamental frequencies in the receive signal. In addition, the wall filter weightings 56 which are $a_0, a_1, \ldots, a_{N-1}$ are selected so that the fundamental signals are high-pass filtered across firings when the respective output signals of the FIR filter for a given transmit focal position are summed. The summed signal is then gray scale B-mode processed in conventional fashion, i.e., envelope detection, logarithmic compression, etc.

In accordance with the foregoing preferred embodiment of the invention, the gray scale B-mode flow image is colored according to the color flow data in channel 9C. In addition, some stationary component of the B-mode image may be fed through the wall filter, permitting the diagnostician to observe the flow of blood relative to known anatomical landmarks during medical diagnosis. This B-mode image feed-through is achieved by perturbing one of the wall filter weightings. For example, the weighting $a_0$ for the first transmit firing can be perturbed by an amount $\alpha$, as shown in the flow chart of FIG. 5. The B-mode feed-through allows the colorized flow image to be superimposed on top of a conventional B-mode image for display.

Referring again to FIG. 1, in the color flow mode of operation, transducer 10 is pulsed 6–16 times along each ultrasound beam. Thus, receiver 30 generates separate received signals for the gray scale and color flow modes of operation which are separately processed in channels 9G and 9C.

Still referring to FIG. 1, beamformer 30 sums the delayed channel data and outputs a beam summed signal which is demodulated into in-phase and quadrature (I/Q) signal components by a demodulator (not shown). The B-mode I, Q outputs from the demodulator are transmitted to a mid processor 8G for gray scale B-mode processing, and the color flow I, Q outputs from the demodulator are transmitted to a mid-processor 8C for color processing.

FIG. 2 illustrates mid-processor 8C for color flow channel 9C. The I/Q signal components from the demodulator are stored in a corner turner memory 117, whose purpose is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are passed through a wall filter 119 which rejects any clutter corresponding to stationary or very slow-moving tissue. The filtered outputs are then fed into a parameter estimator 111, which converts the range cell information into the intermediate autocorrelation parameters N, D and R(0). N and D are the numerator and denominator for the autocorrelation equation, as shown below:

$$N = \sum_{i=1}^{M-1} (I_i Q_{i+1} - I_{i+1} Q_i) \qquad (2)$$

$$D = \sum_{i=1}^{M-1} (I_i I_{i+1} + Q_i Q_{i+1}) \qquad (3)$$

where $I_i$ and $Q_i$ are the demodulated, basebanded input data for firing i, and M is the number of firings in the packet. R(0) is approximated as a finite sum over the number of firings in a packet, as follows:

$$R(O) = \sum_{i=1}^{M-1} \frac{(I_i^2 + Q_i^2 + I_{i+1}^2 + Q_{i+1}^2)}{2} \qquad (4)$$

A processor converts N and D into a magnitude and phase for each range cell. The equations used are as follows:

$$|R(T)| = \sqrt{N^2 + D^2} \qquad (5)$$

$$\phi(R(T)) = \tan^{-1}\left[\frac{N}{D}\right] \qquad (6)$$

The parameter estimator processes the magnitude and phase values into signals having values representing estimates of power, velocity and turbulence or variance which are transmitted on conductors 111A, and 111B and 111C, respectively. The phase is used to calculate the mean Doppler frequency, which is proportional to the velocity as shown below; R(0) and |R(T)|(magnitude) are used to estimate the turbulence.

The mean Doppler frequency in hertz is obtained from the phase of N and D and the pulse repetition from T:

$$\bar{f} = \frac{1}{2\pi T}\tan^{-1}\left[\frac{N}{D}\right] = \frac{1}{2\pi T}(\phi(R(T))) \quad (7)$$

The mean velocity is calculated using the Doppler shift equation below. Since θ, the angle between the flow direction and the sampling direction, is not known, cos θ is assumed to be 1.0.

$$\bar{v} = \frac{\bar{f}}{f_o}\frac{c}{2\cos\theta} \quad (8)$$

Preferably, the parameter estimator does not calculate the mean Doppler frequency as an intermediate output, but calculates $\bar{v}$ directly from the phase output of the processor using a look-up table.

The turbulence may be calculated in the time domain as a second-order series expansion of the variance of the mean Doppler frequency. The time domain expression for turbulence involves calculating the zero-lag and one-lag autocorrelation functions, R(0) and R(T) respectively. The exact autocorrelation functions are approximated by finite sums over the known data in the number of firings in a packet:

$$\sigma^2 = \frac{2}{(2\pi T)^2}\left[1 - \frac{|R(T)|}{R(0)}\right] \quad (9)$$

The mean value signal phi (R(T)) is an estimate of the mean Doppler frequency shift of the flowing reflectors, which in turn is proportional to the mean blood flow velocity. The variance signal σ² indicates the frequency spread of the flow signal component of the baseband echo signal. This value is indicative of flow turbulence, since laminar flow has a very narrow range of velocities, while turbulent flow is a mixture of many velocities. To indicate the strength of the signal from the flowing reflectors, the signal R(0) indicates the amount of the returned power in the Doppler-shifted flow signal.

The signal power on conductor 111A is passed through a data compression module 113 to an output path 113A. Module 113 compresses the data according to families of data compression curves. A different family of curves can be provided for different scanning applications. For example, one family of curves is provided for renal scanning, while another family of curves is provided for carotid artery scanning. Typically, there are about three curves per family. The dynamic range of the signals is changed according to the curve used for the data compression. The curves in each family are arranged in order of increasing dynamic range. Controller 20 sets the default curve when a user selects the scan application. The dynamic range controls the range of intensities or lumens created on display 19.

Referring to FIG. 3, gray scale B-mode mid-processor 8G for gray scale channel 9G includes an envelope detector 110 for forming the envelope of the beamsummed receive signal by computing the quantity $(I^2+Q^2)^{1/2}$. The envelope of the signal undergoes some additional B-mode processing, such as logarithmic compression (block 112 in FIG. 3), to form display data representing a two dimensional image which is output to the scan converter 14 (FIG. 1).

Referring again to FIG. 1, the color flow estimates and B-flow gray scale display data are sent to the scan converter 14, which converts the data into a two dimensional X-Y format for video display. The scan-converted frames are passed to a video processor 17, which basically maps the video data to a display combined color map and gray scale image frames for video display. The image frames are then sent to the video monitor 19 for display. Typically, for colored gray scale images, either velocity or power are displayed with gray scale. System control is centered in a host computer (not shown), which accepts operator inputs through an operator interface (e.g., a keyboard) and in turn controls the various subsystems.

In general, for B-flow gray scale images, the display data is converted by the scan converter 14 into X-Y format for video display. The scan-converted frames are passed to the video processor 17, which maps the video data to a gray scale or mapping for video display. The gray scale image frames are then sent to the video monitor 19 for display.

The images displayed by the video monitor 19 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 19 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

Figure 4:
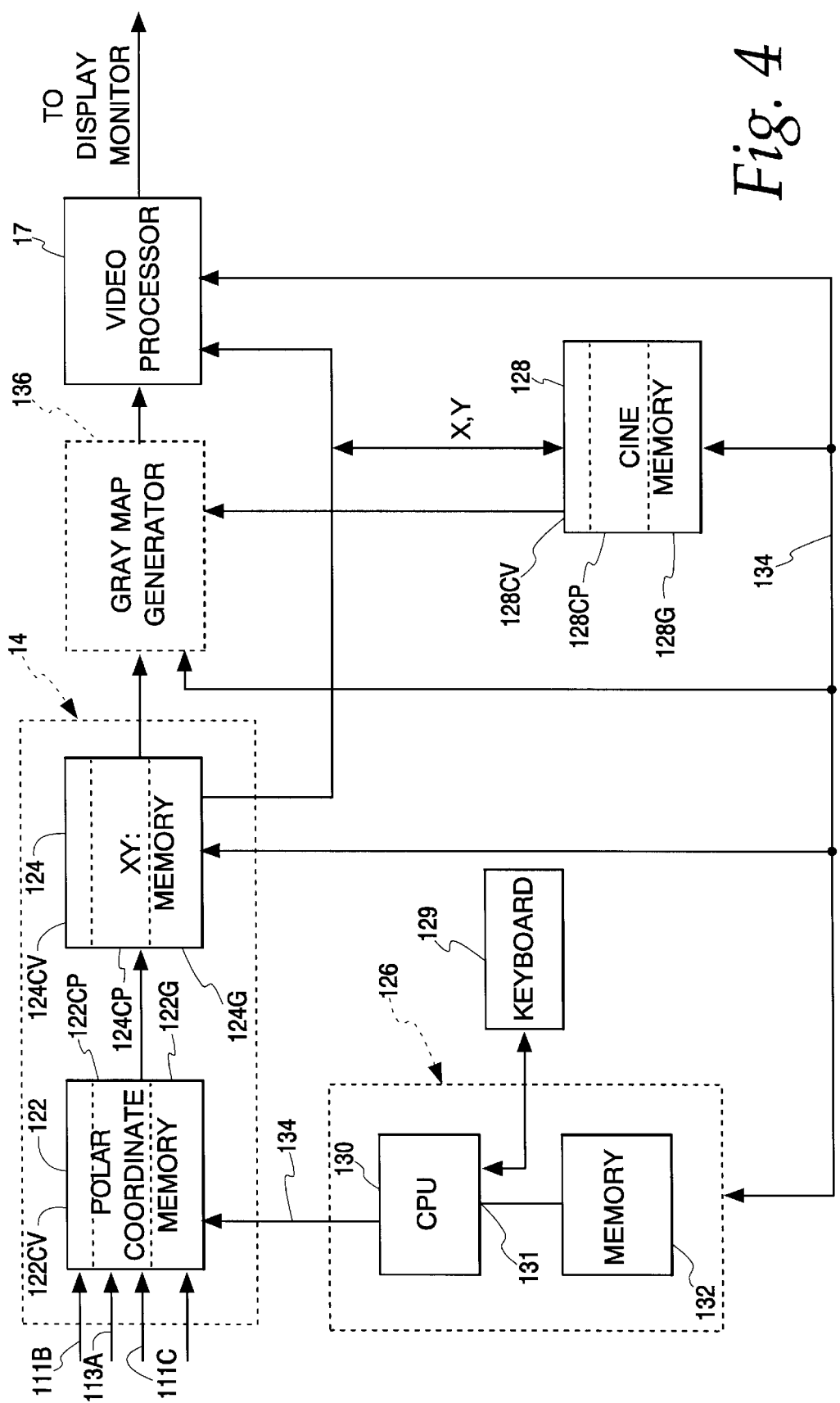
FIG. 4 is a schematic block diagram showing additional details of portions of the system illustrated in FIG. 1.

Referring to FIG. 4, system control is centered in a host computer or processor 126, which accepts operator inputs through an operator interface (not shown) and in turn controls the various subsystems. Processor 126 also generates the system timing and control signals, and comprises a central processing unit (CPU) 130 and a random access memory 132. A keyboard 129 is used to enter data into CPU 130. The CPU 130 has read only memory incorporated therein for storing routines used in constructing gray and color maps based on acquired raw data.

The scan converter 14 comprises a polar coordinate memory 122 and an X-Y memory 124. The gray scale B-mode flow and color flow intensity data stored in polar coordinate (R-θ) sector format in memory 122 is transformed to appropriately scaled Cartesian coordinate pixel display data, which is stored in X-Y memory 124. Color flow velocity data is stored in memory locations 122CV; color flow power data is stored in memory locations 122CP and gray scale B-mode flow data is stored in memory locations 122G. The color flow velocity data also is stored in memory locations 124CV; the color flow power data is stored in memory locations 124CP and the B-flow gray scale data is stored in memory locations 124G. The scan-converted frames are passed to video processor 17, which maps the data to a colored gray map for video display. The color flow data is essentially used as a tool to identify the correct B-mode flow data pixels to colorize. The colored gray scale image frames are then sent to the video monitor for display.

Successive frames of acoustic sample data are stored in cine memory 128 on a first-in, first-out basis. Color velocity frames are stored in memory locations 128CV; color power frames are stored in memory locations 128CP and B-flow gray scale frames are stored in memory locations 128G. In the color region of interest, for every word of color velocity and color power data corresponding to a display pixel, there is a corresponding word of B-flow gray scale data corresponding to that pixel. The cine memory is like a circular image buffer that runs in the background, continually capturing acoustic sample data that is displayed in real time to the user. When the user freezes the system, the user has the capability to view acoustic sample data previously captured in cine memory.

The CPU 130 controls polar coordinate memory 122, XY memory 124 and the cine memory 128 via the system control bus 134. In particular, the CPU 130 controls the flow of data from polar coordinate memory 122 to XY memory 124, from XY memory 124 to the video processor 17 and to the cine memory 128 and from the cine memory to the video processor 17 and to the CPU 126 itself The CPU also loads the gray maps, color maps and combined gray scale and color maps into the video processor.

Image frames are collected in cine memory 128 on a continuous basis. The cine memory 128 provides resident digital image storage for single image review and multiple image loop review and various control functions. The region of interest displayed during single-image cine replay is that used during the image's acquisition. The cine memory also acts as a buffer for transfer of images to digital archival devices (not shown) via processor 126.

Figure 6:
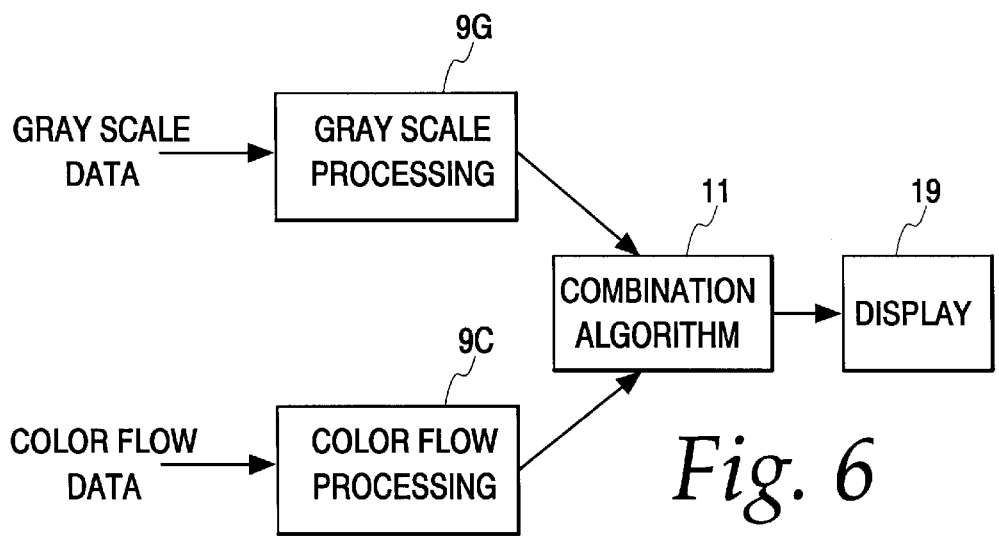
FIG. 6 is a schematic block diagram illustrating a preferred mode of combining gray scale data and color flow data in accordance with the invention.

The preferred embodiment combines color flow data (velocity or power) and gray scale data, as shown by the block diagram in FIG. 6. Each data path of channel 9G and channel 9C is processed separately and then combined, with the result sent to display 19. The exact processing and combination algorithms 11 will vary with desired results. For example, the gray scale flow and color flow data may simply be added for display. In this case, the magnitude and dynamic range of the gray scale and color flow data may need adjustment in order for characteristics of both imaging modes to appear in the combined image. Alternatively, the color flow data can be used as a threshold which the system subsequently uses for determining whether a gray scale flow pixel should be colorized. Other colorizing methods will be apparent to those skilled in the art.

In addition, the combination algorithm may be implemented anywhere in the signal path (e.g., anywhere in receive channels 9C and 9G) once both color flow and gray scale flow data has been generated (after 8C, 8G in FIG. 1). For example, the color flow and gray scale data may be combined on a pixel basis from memories 124CV and 124G or from memories 124CP and 124G after each has been converted and interpolated to display format (i.e., scan converted). Similar combinations of data can be made from memories 128CV, 128CP and 128G. Color flow and gray scale flow data also may be combined from memories 122CV and 122G or from memories 122CP and 122G. The combined data results in combined signals that enable generation of a colored gray scale image on display 19.

The location of gray scale flow/color flow combination is controlled by the color flow region-of-interest (CF ROI) 160 (FIG. 7), which determines where color flow data is acquired. Adjusting the size and position of color flow ROI 160 allows some or all of the field of view to be displayed in composite mode. Regions outside the ROI 160 are processed using gray scale data only which is displayed in region 150 of display 19.

FIG. 7 displays in ROI 160 a combined color flow and gray scale image acquired using system 1. The image shows the bifurcation region of a carotid artery 166 having artery walls 162 and 164. In this case, a pixel based combination algorithm 11 was used. The color flow data processing was similar to traditional power Doppler imaging, however, a specialized color map was used, converting power values to color pixels. Gray scale data generated according to system 1 was processed without modification. Data from memories 124CP and 124G were combined according to the algorithm in gray map generator 136. More specifically, the grayscale and color flow PDI pixels were combined by adding the red-green-blue (RGB) values of each and displaying the result in ROI 160. The reduced dynamic range and intensity of the color map, displayed on the left-hand side of the image, allowed gray scale dynamics to be seen after data combination, avoiding saturation and loss of contrast. The color flow PDI/gray scale blending was restricted to the region defined by the CF ROI 160 which displayed a color gray scale image. The remaining image region 150 was displayed using only the gray scale data generated by channel 9G.

Those skilled in the art will recognize that the preferred embodiments may be altered and modified without departing from the true spirit and scope of the invention as defined by the accompanying claims.

What is claimed is:

1. In an ultrasound system, apparatus for displaying an image of a subject under study by combining the data from a gray scale mode of operation and a color flow mode of operation comprising:
   a transducer suitable for sending beams of ultrasound waves into said subject, receiving echo ultrasound waves from said subject in response to said transmitted ultrasound waves, and for converting said echo ultrasound waves into corresponding received signals;
   a transmitter connected to pulse said transducer a first predetermined number of times along each of a plurality of said beams in said gray scale mode of operation so that said transducer transmits first ultrasound waves and generates first received signals in response to echo ultrasound waves received in response to said first ultrasound waves and to pulse said transducer a second predetermined number of times along each of a plurality of said beams during said color flow mode of operation so that said transducer transmits second ultrasound waves and generates second received signals in response to echo ultrasound waves received in response to said second ultrasound waves;
   a first receive channel responsive to said first received signals to generate gray scale data representing movement of portions of said subject in two dimensions;
   a second receive channel responsive to said second received signals to generate color flow data representing movement of portions of said subject;
   a processor arranged to perform an arithmetic operation on at least portions of said gray scale data with said color flow data to generate combined signals; and
   a display for displaying an image responsive to said combined signals so that movement of portions of said subject are displayed with a colored gray scale image.

2. Apparatus, as claimed in claim 1, wherein said gray scale mode of operation comprises a B-mode of operation modified to enable visualization of said movement.

3. Apparatus, as claimed in claim 2, wherein said color flow mode of operation comprises a color flow power mode of operation.

4. Apparatus, as claimed in claim 3, wherein said color flow data represent the power of the second received signals.

5. Apparatus, as claimed in claim 2, wherein said color flow mode of operation comprises a color flow velocity mode of operation.

6. Apparatus, as claimed in claim 5, wherein said color flow data represent the velocity of portions of said subject.

7. Apparatus, as claimed in claim 1, wherein said first received signals define amplitude values and wherein said first receive channel subtracts at least some of said amplitude values.

8. Apparatus, as claimed in claim 7, wherein said first receive channel comprises a wall filter.

9. Apparatus, as claimed in claim 1, wherein said first predetermined number lies in the range of two to four.

10. Apparatus, as claimed in claim 9, wherein said second predetermined number lies in the range of 6 to 16.

11. In an ultrasound system, a method of displaying an image of a subject under study by combining the data from a gray scale mode of operation and a color flow mode of operation comprising:

sending beams of ultrasound waves into said subject a first predetermined number of times along each of a plurality of ultrasound beams in said gray scale mode of operation;

receiving first echo ultrasound waves from said subject in response to said transmitted ultrasound waves in said gray scale mode of operation;

converting said first echo ultrasound waves into corresponding first received signals;

sending beams of ultrasound waves into said subject a second predetermined number of times along each of a plurality of ultrasound beams in said color flow mode of operation;

receiving second echo ultrasound waves from said subject in response to said transmitted ultrasound waves in said color flow mode of operation;

converting said second echo ultrasound waves into corresponding second received signals;

generating gray scale data representing movement of portions of said subject in two dimensions in response to said first received signals;

generating color flow data representing movement of portions of said subject in response to said second received signals;

performing an arithmetic operation on at least portions of said gray scale data with said color flow data to generate combined signals; and displaying an image responsive to said combined signals so that movement of portions of said subject are displayed with a colored gray scale image.

12. A method, as claimed in claim 11, wherein said gray scale mode of operation comprises a B-mode of operation modified to enable visualization of said movement.

13. A method, as claimed in claim 12, wherein said color flow mode of operation comprises a color flow power mode of operation.

14. A method, as claimed in claim 13, wherein said color flow data represent the power of the second received signals.

15. A method, as claimed in claim 12, wherein said color flow mode of operation comprises a color flow velocity mode of operation.

16. A method, as claimed in claim 15, wherein said color flow data represent the velocity of portions of said subject.

17. A method, as claimed in claim 11, wherein said first received signals define amplitude values and wherein said generating gray scale data comprises subtracting at least some of said amplitude values.

18. A method, as claimed in claim 17, wherein said generating gray scale data comprises wall filtering said first received signals.

19. A method, as claimed in claim 11, wherein said first predetermined number lies in the range of two to four.

20. A method, as claimed in claim 19, wherein said second predetermined number lies in the range of 6 to 16.

* * * * *